(12) United States Patent
Mackenzie et al.

(10) Patent No.: US 10,405,280 B2
(45) Date of Patent: Sep. 3, 2019

(54) CELLULAR TELECOMMUNICATIONS NETWORK

(71) Applicant: British Telecommunications Public Limited Company, London (GB)

(72) Inventors: Richard Mackenzie, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/082,870

(22) PCT Filed: Feb. 8, 2017

(86) PCT No.: PCT/EP2017/052738
§ 371 (c)(1),
(2) Date: Sep. 6, 2018

(87) PCT Pub. No.: WO2017/157585
PCT Pub. Date: Sep. 21, 2017

(65) Prior Publication Data
US 2019/0098582 A1 Mar. 28, 2019

(30) Foreign Application Priority Data
Mar. 17, 2016 (EP) .................................. 16160809

(51) Int. Cl.
*H04W 52/24* (2009.01)
*H04W 76/11* (2018.01)
(Continued)

(52) U.S. Cl.
CPC ......... *H04W 52/244* (2013.01); *H04W 16/10* (2013.01); *H04W 24/02* (2013.01);
(Continued)

(58) Field of Classification Search
CPC ... H04W 52/244; H04W 76/11; H04W 16/10; H04W 24/08
See application file for complete search history.

(56) References Cited

U.S. PATENT DOCUMENTS 8,903,402 B2 12/2014 Guo et al.
9,215,629 B2 12/2015 Hapsari et al.
(Continued)

FOREIGN PATENT DOCUMENTS

CN 105611554 A 5/2016
EP 2 154 917 A1 2/2010
(Continued)

OTHER PUBLICATIONS

International Preliminary Report on Patentability for corresponding International Application No. PCT/EP2017/052738 dated Jun. 22, 2018; 27 pages.

(Continued)

*Primary Examiner* — Wei Zhao
(74) *Attorney, Agent, or Firm* — Patterson Thuente Pedersen, PA (57) ABSTRACT

A method of operating a first base station in a cellular telecommunications network, the cellular telecommunications network further including a second base station, in order to autonomously create a detection scenario for a Physical Cell Identifier (PCI) conflict between the first and second base station, includes the first base station transmitting at a first maximum transmit power about a first coverage area for a first period of time; the first base station transmitting at a second maximum transmit power about a second coverage area for a second period of time, the second coverage area being larger than the first coverage area and (Continued)

the second period of time being shorter than the first period of time; and then the first base station returning to the first maximum transmit power.

15 Claims, 9 Drawing Sheets

(51) Int. Cl.
*H04W 16/10* (2009.01)
*H04W 24/08* (2009.01)
*H04W 24/10* (2009.01)
*H04W 24/02* (2009.01)

(52) U.S. Cl.
CPC ............ *H04W 24/08* (2013.01); *H04W 24/10* (2013.01); *H04W 52/243* (2013.01); *H04W 76/11* (2018.02)

(56) References Cited

U.S. PATENT DOCUMENTS

| | | | |
|---|---|---|---|
| 9,301,105 B2 | 3/2016 | Kim et al. | |
| 9,392,420 B2 | 7/2016 | Fodor et al. | |
| 9,439,137 B2 | 9/2016 | Kim et al. | |
| 2010/0120447 A1 | 5/2010 | Anderson et al. | |
| 2010/0157911 A1 | 6/2010 | Hedge et al. | |
| 2010/0178912 A1 | 7/2010 | Gunnarsson et al. | |
| 2011/0190027 A1 | 8/2011 | Michel et al. | |
| 2011/0274030 A1 | 11/2011 | Wang et al. | |
| 2012/0002537 A1 | 1/2012 | Bao et al. | |
| 2012/0026865 A1 | 2/2012 | Fan et al. | |
| 2012/0157095 A1 | 6/2012 | Fodor et al. | |
| 2012/0236828 A1 | 9/2012 | Hapsair et al. | |
| 2012/0257495 A1 | 10/2012 | Schwarz et al. | |
| 2012/0264418 A1 | 10/2012 | Lee et al. | |
| 2012/0275315 A1 | 11/2012 | Schlangen et al. | |
| 2013/0005340 A1 | 1/2013 | Drazynski et al. | |
| 2013/0035033 A1 | 2/2013 | Sanneck et al. | |
| 2013/0084873 A1 | 4/2013 | Sharony et al. | |
| 2013/0170435 A1* | 7/2013 | Dinan ................. | H04L 45/50 370/328 |
| 2013/0260768 A1 | 10/2013 | Guo et al. | |
| 2014/0018057 A1 | 1/2014 | Yu et al. | |
| 2014/0038593 A1 | 2/2014 | Kim et al. | |
| 2014/0050135 A1 | 2/2014 | Zhang et al. | |
| 2014/0071891 A1 | 3/2014 | Zhou et al. | |
| 2014/0092765 A1 | 4/2014 | Agarwal et al. | |
| 2014/0187236 A1 | 7/2014 | Chaing et al. | |
| 2014/0269547 A1 | 9/2014 | Valliappan et al. | |
| 2014/0286218 A1 | 9/2014 | Park et al. | |
| 2015/0063136 A1 | 3/2015 | Shen et al. | |
| 2015/0092552 A1* | 4/2015 | Bajj ..................... | H04W 28/08 370/235 |
| 2015/0131524 A1 | 5/2015 | Cavalcante et al. | |
| 2015/0271714 A1 | 9/2015 | Shetigar et al. | |
| 2015/0312769 A1 | 10/2015 | Shindo | |
| 2015/0358940 A1 | 12/2015 | Zhang et al. | |
| 2016/0088493 A1 | 3/2016 | Byun et al. | |
| 2016/0192177 A1 | 6/2016 | Kim et al. | |
| 2017/0055186 A1* | 2/2017 | Donepudi ............. | H04W 4/029 |
| 2017/0086181 A1 | 3/2017 | Briggs et al. | |
| 2017/0303188 A1 | 10/2017 | Fitch et al. | |
| 2018/0054840 A1 | 2/2018 | Fitch et al. | |
| 2018/0262922 A1 | 9/2018 | MacKenzie et al. | |

FOREIGN PATENT DOCUMENTS

| | | |
|---|---|---|
| EP | 2 271 142 A1 | 1/2011 |
| EP | 2 663 131 A1 | 11/2013 |
| EP | 2 814 279 A1 | 12/2014 |
| EP | 2 916 584 A1 | 9/2015 |
| EP | 2 928 225 A1 | 10/2015 |
| EP | 2 975 886 A1 | 1/2016 |
| EP | 3 065 438 A1 | 9/2016 |
| WO | WO 2009/022976 A1 | 2/2009 |
| WO | WO 2010/024743 A1 | 3/2010 |
| WO | WO 2011/028158 A1 | 3/2011 |
| WO | WO 2011/056023 A2 | 5/2011 |
| WO | WO 2012/138125 A2 | 10/2012 |
| WO | WO 2012/148442 A1 | 11/2012 |
| WO | WO 2013/071813 A1 | 5/2013 |
| WO | WO 2013/120274 A1 | 8/2013 |
| WO | WO 2013/142361 A1 | 9/2013 |
| WO | WO 2014/161896 A1 | 10/2014 |
| WO | WO 2015/019317 A1 | 2/2015 |
| WO | WO 2015/034775 A1 | 3/2015 |
| WO | WO 2015/062060 A1 | 5/2015 |
| WO | WO 2016/079016 A1 | 5/2016 |
| WO | WO 2016/146328 A1 | 9/2016 |
| WO | WO 2017/148752 A1 | 9/2017 |
| WO | WO 2018/059858 A1 | 9/2017 |
| WO | WO 2018/059859 A1 | 4/2018 |
| WO | WO 2018/059860 A1 | 4/2018 |

OTHER PUBLICATIONS

International Search Report and Written Opinion for corresponding International Application No. PCT/EP2017/052738 dated Mar. 27, 2017; 20 pages.
International Search Report for corresponding International Application No. PCT/EP2017/052738 dated Feb. 15, 2018; 12 pages.
European Search Report for corresponding EP Application No. 16160809.6 dated Sep. 26, 2016; 14 pages.
UK Examination Report for corresponding GB Patent Application No. GB1604515.5, dated May 11, 2017, 1 pages.
UK Examination Report for corresponding GB Patent Application No. GB1604515.5, dated Jan. 31, 2018, 3 pages.
UK Intention to Grant for corresponding GB Patent Application No. GB1604515.5, dated May 11, 2018, 2 pages.
UK Combined Search and Examination Report for corresponding GB Patent Application No. GB1604515.5, dated Sep. 9, 2016, 3 pages.
Younis, et al.; Military Communications; "Cognitive MANET Design for Mission-Critical Networks", IEEE Communications Magazine, Oct. 2009; 0163-6804/09 2009 IEEE; 5 pages.
3rd Generation Partnership Project; Technical Specification Group Services and System Aspects; Telecommunication Management; "Study on Management of Evolved Universal Terrestrial Radio Access Network (E-UTRAN) and Evolved Packet Core (EPC)"; Release 8 3GPP TR 32.816 V8.0.0 (Dec. 2008) Technical Report; Valbonne—France; 38 pages.
QUALCOMM Technologies, Inc,; "LTE Small Cell SON Test Cases Functionality and Interworking"; Jun. 5, 2015; Qualcomm Technologies, Inc. 5775 Morehouse Drive San Diego, CA 92121 U.S.A.; 82 pages.
Application and Filing Receipt for U.S. Appl. No. 16/079,327, filed Aug. 23, 2018, Inventor(s): Briggs et al.
Application and Filing Receipt for U.S. Appl. No. 15/516,765, filed Apr. 4, 2017, Inventor(s): Fitch et al.
Application and Filing Receipt for U.S. Appl. No. 15/553,708, filed Aug. 25, 2017, Inventor(s): Fitch et al.
Application and Filing Receipt for U.S. Appl. No. 15/762,022, filed Mar. 21, 2018, Inventor(s): MacKenzie et al.
Extended European Search Report for corresponding EP Application No. 19194204.5 dated Jul. 23, 2015; 7 pages.
International Search Report and Written Opinion of the International Searching Authority for PCT Application No. PCT/EP2015/076524 dated Dec. 21, 2015; 11 pages.
International Preliminary Report on Patentability for PCT Application No. PCT/EP2015/076524 dated Mar. 7, 2017; 11 pages.
International Preliminary Report on Patentability for PCT Application No. PCT/EP2017/053957 dated Sep. 4, 2018; 6 pages.
Motorola et al., "Draft CR capturing HeNB inbound mobility agreements," 3GPP Draft; R2-096401 CR HENB 36_300 Agreements_ V7, 3rd Generation Partnership Project (3GPP), Jeju, Korea (Nov. 9, 2009); 4 pages. XP050391033.
Qualcomm Europe, "QoS support for hybrid CSG cells," 3GPP Draft; R3-091454, 3rd Generation Partnership Project (3GPP), San (56) References Cited

OTHER PUBLICATIONS

Francisco, US (May 4, 2009); 3 pages. XP050341776.

Qualcomm Europe et al., "QoS principles for CSG members and non-members at hybrid access mode HeNBs," 3GPP Draft; R3-091022, $3^{rd}$ Generation Partnership Project (3GPP), San Francisco, US (Apr. 29, 2009); 4 pages. XP050341407.

International Search Report & Written Opinion for PCT Application No. PCT/EP2016/053286 dated Apr. 11, 2016; 11 pages.

International Preliminary Report on Patentability for PCT Application No. PCT/EP2016/053286 dated Feb. 6, 2017; 13 pages.

Extended European Search Report for corresponding EP Application No. 15275077.4 dated Sep. 4, 2015; 8 pages.

Codan Radio, "RF Link Controlled Base Station," Codan Radio Communications https://www.codanradio.com/nroduct/rf-link-controlled-base/ [retrieved on Oct. 3, 2018]; 2 pages.

$3^{rd}$ Generation Partnership Project, "3GPP 36.420 v8.0.0 Technical Specification; X2 general aspects and principals (Release 8)," (Dec. 2007) http://wvvw.mc.ioi3GPP/Specs/36420-800.pdf; [retrieved on Oct. 3, 2018]; 11 pages.

EP Search Report for corresponding EP Application No. 15187067.2; dated Mar. 18, 2016; 8 pages.

GB Examination Report for corresponding GB Application No. 1517069.9; dated Jan. 31, 2018; 3 pages.

GB Search Report for corresponding GB Application No. 1517069.9; dated Mar. 7, 2016; 4 pages.

International Preliminary Report on Patentability for corresponding PCT Application No. PCT/EP2016/069745, dated Oct. 20, 2017, 13 pages.

International Search Report and the Written Opinion of the International Searching Authority for PCT Application No. PCT/EP2016/069745, dated Nov. 11, 2016, 9 pages.

Qualcomm Technologies, Inc. "LTE Small Cell SON Test Cases, Functionality and Interworking", Jun. 5, 2015; San Diego, CA, USA; 82 pages.

Wu et al., Hai Jiang Yi; "Physical Cell Identity Self-Organization for Home eNodeB Deployment in LTE"; Nokia Siemens Networks; 978-1-4244-3709-2/10; 2010 IEEE; Beijing China; 6 pages.

International Search Report and Written Opinion for PCT Application No. PCT/EP2017/053957 dated May 23, 2017; 8 pages.

European Search Report for EP Application No. 16158665.6 dated Sep. 13, 2016; 6 pages.

GB Combined Search and Examination Report for GB Application No. GB1603748.3; dated Aug. 26, 2016; 6 pages.

Mukhopadhyay et al.; "Novel RSSI Evaluation Models for Accurate Indoor Localization with Sensor Networks"; 978-1-4799-2361-8/14; 2014 IEEE; Bharti School of Telecommunication Technology and Management ITT Delhi Hauz Khas, New Delhi; 6 pages.

3rd Generation Partnership Project; Technical Specification Group Radio Access Network; Evolved Universal Terrestrial Radio Access (E-UTRA); Radio Frequency (RF) system scenarios (Release 9) 3GPP TR 36.942 V9.3.0 (Jun. 2012); 83 pages.

MacQueen, J. "Some Methods for Classification and Analysis of Multivariate Observations"; Fifth Berkeley Symposium; University of California, Los Angeles (1967). pp. 281-297 (17 pages total).

NGNM the engine of broadband wireless innovation "Recommended Practices for multi-vendor SON deployment" Deliverable D2 Version 1.0 by NGNM Alliance; Reading Bridge House George Street Reading Berkshire RG 1 8LS UK; Jan. 28, 2014; 30 pages.

Small Cell Forum Release 9.0; Document 176.09.01 LTE small cell SON test cases: Functionality and interworking; version 176.09.01; Feb. 21, 2017; 95 pages.

Fairbrother et al., "A Two-Level Graph Partitioning Problem Arising in Mobile Wireless Communications"; arXiv: 1705.08773v1 [math.OC] May 24, 2017; 23 pages.

Web article, "DSDP", NEOS Interfaces to DSDP http://www.mcs.anl.gov/DSDP; retrieved Jul. 3, 2017; 4 pages.

Web article, "Welcome to CVXPY" Welcome to CVXPY—CVXPY 0.4.9 documentation, retrieved Jul. 3, 2017; http://www.cvxpy.org/en/latest; 1 page.

Ghaddar et al., "A branch-and-cut algorithm based on semidefinite programming for the minimum k-parition problem"; Ann Oper Res DO1 10 1007/s10479-008-0481-4; Springer Science+Business Media, LLC 2008; Published online Dec. 3, 2008; 20 pages.

Rendl, F., "Semidefinite Relaxations for Partitioning, Assignment and Ordering Problems"; Cross Mark, Ann Oper Res (2016) 240 119-140 DO1 10 1007/s10479-015-2015-1; Published online Sep. 15, 2015; Springer Science+Business Media New York 2015; 22 pages.

Carlson et al., "Scheduling to Minimize Interaction Cost"; The Johns Hopkins University, Baltimore, Maryland; Jun. 2, 1965; 8 pages.

Ning et al., "Fuzzy layered physical cell identities assignment in heterogeneous and small cell networks"; Electronics Letters May 12, 2016, vol. 52 No. 10, pp. 879-881; 2 pages.

European Search Report for corresponding EP Application No. 17180358.8; dated Jan. 31, 2018; 5 pages.

GB Search and Examination Report for GB Application No. GB 1710989.3; dated Dec. 1, 2017; 5 pages.

Application and Filing Receipt for U.S. Appl. No. 16/023,917, filed Jun. 29, 2018, Inventor(s): MacKenzie et al.

International Search Report and Written Opinion for corresponding PCT Application No. PCT/EP2017/071645 dated Nov. 27, 2017; 18 pages.

3GPP TS 36.300 V11 6.0 (Jun. 2013); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 650 Route des Luciales—Sophia Antipolis Valbonne—France; 209 pages.

3GPP TS 32.551 V15.0.0 (Jun. 2018); $3^{rd}$ Generation Partnership Project; Technical Specification Group Services and System Aspects; Telecommunication management; Energy Saving Management (ESM); Concepts and requirements (Release 15); 650 Route des Luciales—Sophia Antipolis Valbonne—France; 26 pages.

3GPP TR 36.927 V15.0.0 (Jul. 2018); $3^{rd}$ Generation Partnership Project; Technical Specification Group Radio Access Network; Evolved Universal Terrestrial Radio Access (E-UTRA); Potential solution for energy saving for E-UTRAN (Release 15); 650 Route des Luciales—Sophia Antipolis Valbonne—France; 22 pages.

3GPP TS 36.300 V13.3.0 (Mar. 2016); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN)' Overall description; Stage 2 (Release 13); 650 Route des Luciales—Sophia Antipolis Valbonne—France; 295 pages.

ETSI TS 132 551 V13.0.0 (Feb. 2016); Technical Specification Universal Mobile Telecommunications System (UMTS); LTE; Telecommunication management; Energy Saving Management (ESM); Concepts and requirement (3GPP TS 32.551 version 13.0.0 Release 13); 650 Route des Luciales—Sophia Antipolis Valbonne—France; 28 pages.

3GPP TR 24.826 V11.0.0 (Jun. 2011); $3^{rd}$ Generation Partnership Project; Technical Specification Group Core Network and Terminals; Study on impacts on signaling between User Equipment (UE) and core network from energy saving (Release 11); 650 Route des Luciales—Sophia Antipolis Valbonne—France; 33 pages.

ETSI TR 136 927 V13.0.0 (Jan. 2016); Technical Report LTE; Evolved Universal Terrestrial Radio Access (E-UTRA); Potential solutions for energy saving for E-UTRAN (3GPP TR 36.927 version 13.0.0 Release 13); 650 Route des Luciales—Sophia Antipolis Valbonne—France; 26 pages.

Application as filed for U.S. Appl. No. 16/335,708, filed Mar. 22, 2019, Inventor(s): Mackenzie et al.

Application as filed for U.S. Appl. No. 16/335,802, filed Mar. 22, 2019, Inventor(s): Mackenzie et al.

Application as filed for U.S. Appl. No. 16/335,863, filed Mar. 22, 2019, Inventor(s): Mackenzie et al.

International Search Report and Written Opinion for PCT Application No. PCT/EP2017/071646 dated Oct. 18, 2017; 9 pages.

(56) References Cited

OTHER PUBLICATIONS

International Search Report and Written Opinion for PCT Application No. PCT/EP2017/071649 dated Oct. 12, 2017; 9 pages.

* cited by examiner

CELLULAR TELECOMMUNICATIONS NETWORK

CROSS-REFERENCE TO RELATED APPLICATION

The present application is a National Phase entry of PCT Application No. PCT/EP2017/052738, filed Feb. 8, 2017, which claims priority from EP Patent Application No. 16160809.6, filed Mar. 17, 2016 each of which is hereby fully incorporated herein by reference.

TECHNICAL FIELD

The present disclosure relates to a cellular telecommunications network.

BACKGROUND

Figure 1A:
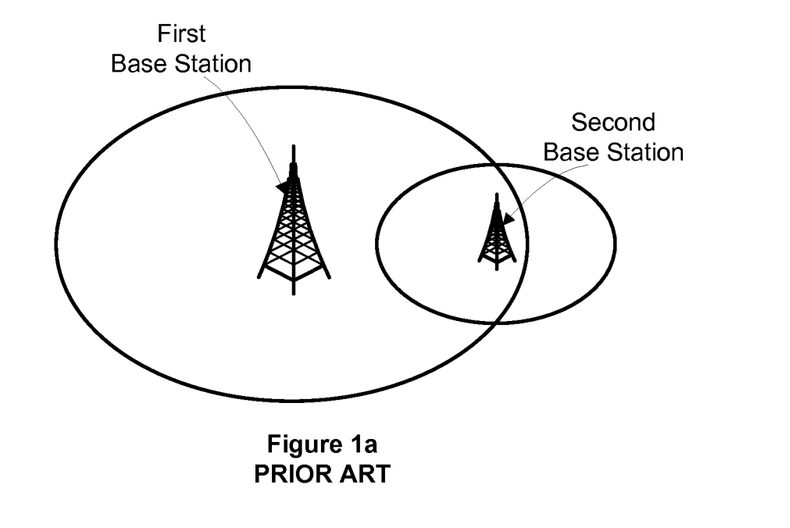
FIGS. 1a and 1b are schematic diagrams illustrating a PCI collision and PCI confusion in the prior art.

A base station in a cellular network is assigned a unique identifier, known in LTE as the enhanced Cell Global Identifier (eCGI), and a further ID known as the Physical Cell Identifier (PCI). There are only 504 PCIs available for all base stations to share, which can lead to issues collectively known as PCI conflicts. A first type of PCI conflict is a PCI collision, which is shown in FIG. 1a. This occurs when two neighboring base stations have the same PCI and have overlapping coverage areas. As the first base station's coverage area covers the second base station (as shown in FIG. 1a), then the second base station can detect the first base station's PCI via a Radio Environment Monitoring (REM) scan, detect the PCI collision, and initiate a PCI conflict resolution process. However, if the two base stations respective coverage areas do not cover the other base station, then this is not possible. This can lead to issues as a User Equipment (UE) in the overlapping area cannot differentiate between signals from either base station. This leads to significant interference and can make channel estimation extremely difficult.

Figure 1B:
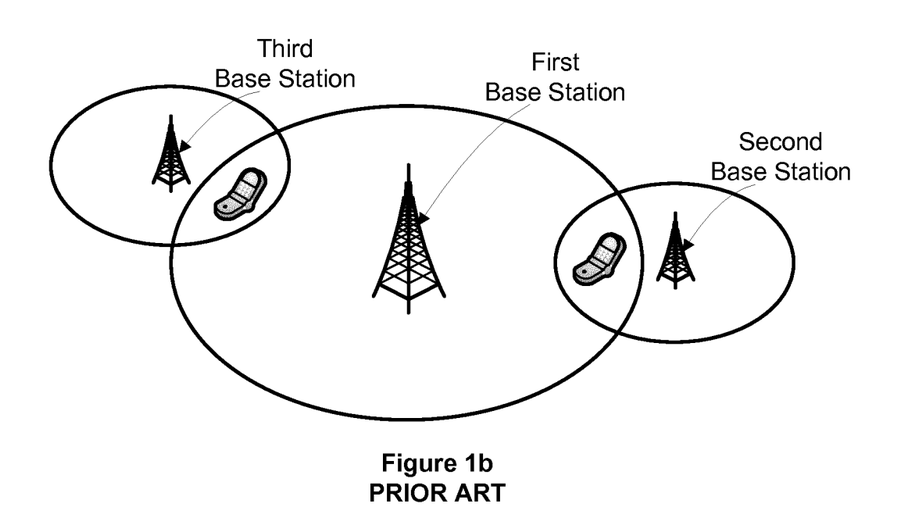

The other type of PCI conflict is PCI confusion, an example of which is shown in FIG. 1b. In this case, a first base station has a coverage area that overlaps with the coverage areas of a second and third base station, but the second and third base station's coverage areas do not overlap and no coverage area covers a neighboring base station. The second and third base station have the same PCI. In this case, no base station can detect the PCI of a neighbor as no base station receives signals from a neighboring base station. Instead, the first base station will receive measurement reports from UEs in both the overlapping coverage area of the first and second base station and the overlapping coverage area of the first and third base station. However, these measurement reports include both the second and third base stations with the same PCI. This may cause handover issues as the first base station cannot differentiate between these two neighboring base stations in a handover process (without additional control signaling to determine further identifiers for the other base stations).

More recent cellular telecommunications networks are known as heterogeneous networks (or "HetNets") as they comprise a mixture of the conventional macro base station and other types of base stations such as the femtocell. A femtocell, also known as a Home evolved Node B (HeNB) is one of a class of base stations known as small cells, which further includes picocells, metrocells and microcells depending on the coverage area. It is intended to deploy HeNBs such that there is a much higher density of HeNBs compared to macro base stations. This has the advantages of increased coverage and capacity for the cellular network. However, the limited number of PCI values and the likely self-organised nature of the femtocell means that such a deployment will likely result in more PCI conflicts, which would reduce the positive impact of the technology.

SUMMARY

It is desirable to alleviate some or all of the above problems.

According to a first aspect of the disclosure, there is provided a method of operating a first base station in a cellular telecommunications network, the cellular telecommunications network further including a second base station, the method comprising: the first base station transmitting at a first maximum transmit power about a first coverage area for a first period of time; the first base station transmitting at a second maximum transmit power about a second coverage area for a second period of time, the second coverage area being larger than the first coverage area and the second period of time being shorter than the first period of time, in order to autonomously create a detection scenario for a Physical Cell Identifier (PCI) conflict between the first and second base station; and then the first base station returning to the first maximum transmit power.

Embodiments of the disclosure provide a method of creating a scenario in which a PCI conflict may be detected by a base station temporarily increasing its coverage area. A neighboring base station may then detect the PCI conflict, and initiate a PCI conflict resolution process. By only increasing the power for a short period of time, any resulting increase in interference is minimized. The base station may therefore operate at a normal transmit power for a majority of the time (e.g. based on its power allocation algorithms), and then briefly increase its transmit power to cause PCI conflict detection scenarios.

These PCI conflict scenarios are typically detected by neighboring base stations which may detect the first base station and a PCI conflict as a result of its new increased coverage area.

The method of operating the first base station may be part of a method of operating a network, the network further comprising a second base station, and the method may further comprise: the second base station discovering the first base station as a result of the first base station transmitting at the second maximum transmit power; the second base station identifying a PCI conflict in the cellular telecommunications network; and the second base station initiating a PCI conflict resolution process.

The present disclosure also provides computer programs and base stations configured to perform the methods of the first and second aspects of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 2:
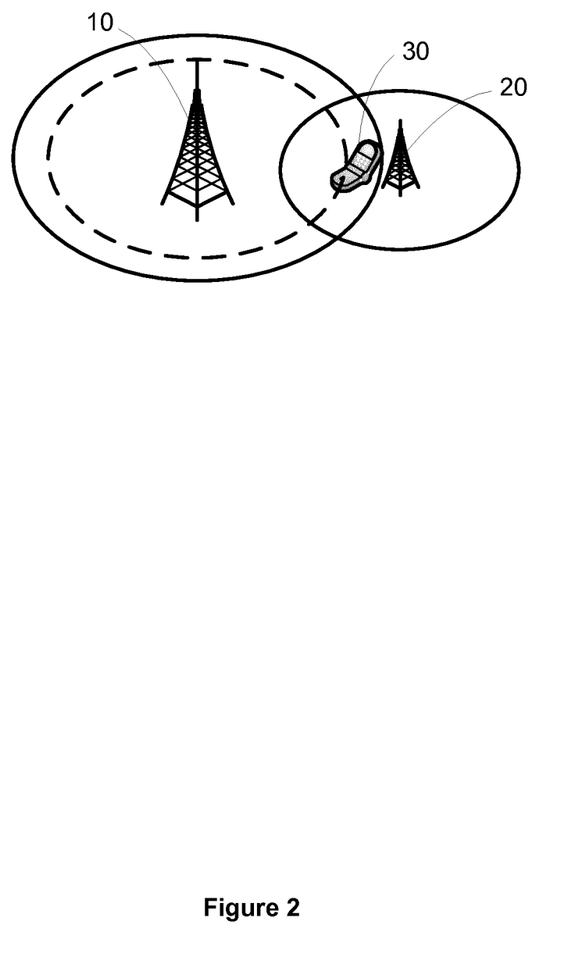
FIG. 2 is a schematic diagram of an embodiment of a cellular telecommunications network of the present disclosure.

A first embodiment of a cellular telecommunications network 1 of the present disclosure will now be described with reference to FIGS. 2 to 4. The cellular network 1 includes a first and second base station, which in this embodiment are both Home evolved Node Bs 10, 20 (hereinafter, "HeNB"), which are otherwise known as small cells, or femtocells, picocells or microcells depending on the coverage areas. The first and second HeNBs' respective coverage areas are illustrated by the enveloping ellipses, which represent the propagation distances for signals transmitted by the first and second HeNB 10, 20. The first and second HeNBs 10, 20 are connected to a Core Network (not shown). FIG. 2 also includes a User Equipment (UE) 30, in the overlapping coverage area between the first and second HeNBs 10, 20.

Figure 3:
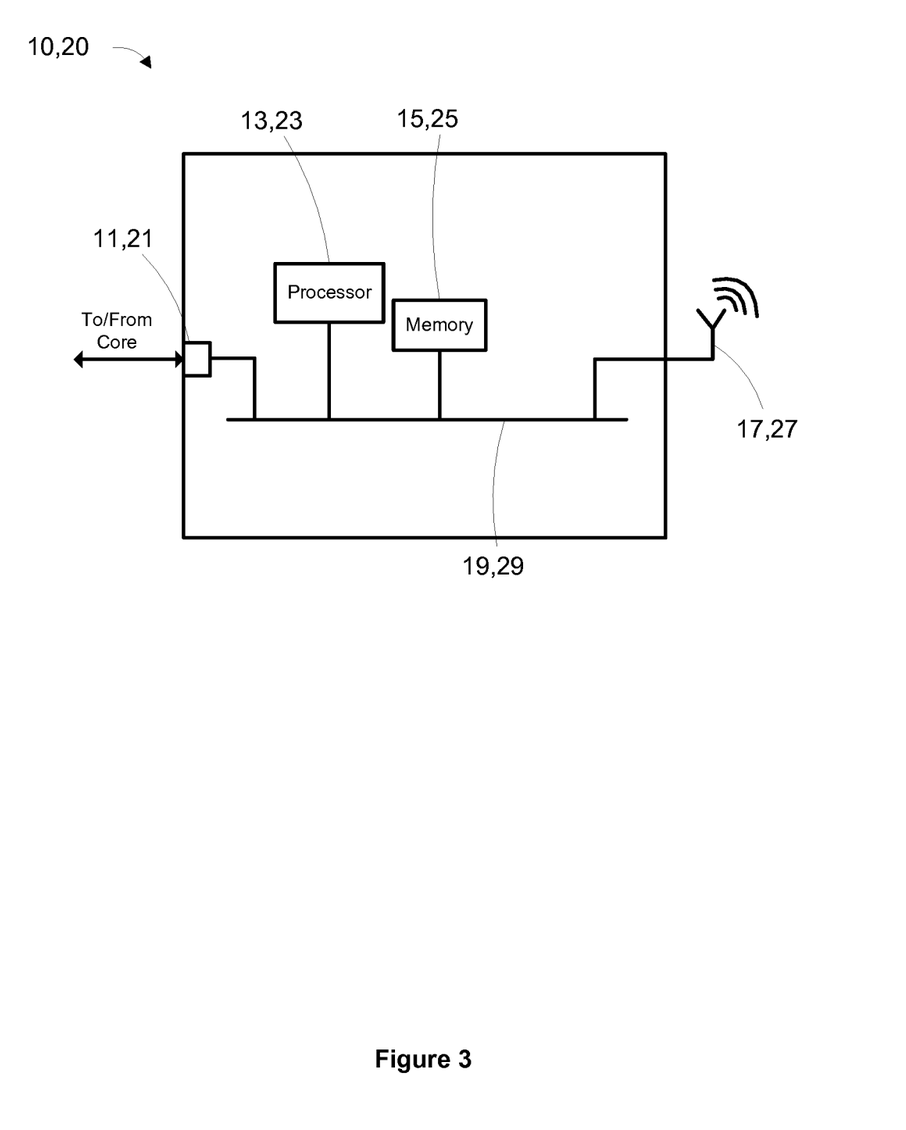
FIG. 3 is a schematic diagram of a base station of the network of FIG. 2.

FIG. 3 is a schematic diagram illustrating various components of the first and second HeNB 10, 20. The skilled person will understand that there may be several physical differences between the construction of the first and second HeNB 10, 20 (and even more so if the first or second base station were a macro base station), but FIG. 3 illustrates the various constituent parts of each which may be of a particular form depending on the deployment scenario. The first and second HeNB 20 each include a first transceiver 11, 21, a processor 13, 23, memory 15, 25, and a second transceiver 17, 27, all connected via bus 19, 29. The first transceivers 11, 21 are commonly known as the backhaul connection and are used for transmissions to and from the Core Network, which would typically be a Digital Subscriber Line (DSL) or optical fiber connection for the first and second HeNB 10, 20. The second transceivers 17, 27 are antennae configured for cellular communications (in this embodiment, via the 4G LTE protocol) with any connected UEs. The processors 13, 23 typically process data packets received via the first transceivers 11, 21 or second transceivers 17, 27 such that they are in a form to be transmitted to their destination (for example, IP data packets received at the first transceiver 11 from the Core Network may be processed into Transport Blocks (TBs) by the processor 13 for onward transmission to the UE 30 via the second transceiver 17, which may be temporarily stored in a buffer in memory 15).

The first and second HeNBs 10, 20 therefore transmit signals to UEs within their respective coverage areas via their first transceivers 11, 21. One task of the processors 13, 23 of the first and second HeNBs 10, 20 is to determine a suitable power value for these transmissions. A higher power level will typically result in a greater coverage area, such that more distant UEs may receive signals from the first transceivers 11, 21 of each HeNB 10, 20. However, this must be a balanced with a number of factors, such as the potential to cause interference should the coverage area overlap with that of another base station, reducing energy consumption, etc. Accordingly, the first and second HeNBs 10, 20 have a process to determine a suitable transmit power level, an example of which (from the perspective of the first HeNB 10) will now be described.

The first HeNB 10 transmits signals which are divided into units in time and frequency domains. One of these units is known as a Resource Block (RB), which is further subdivided into Resource Elements (REs). As the first HeNB 10 operates in accordance with the LTE protocol, a particular set of these REs within the RBs is reserved for reference signals, and the remainder can be used for other purposes (e.g. data). In this embodiment, the first HeNB 10 receives a system information message from a Network Manager (e.g. via the Core Network and first transceiver 11, 21) indicating a range of values to be used for the reference signal power. This range may be, for example, between −30 to −10 dBm per 15 kHz. The processor 13 must select a reference signal power within this range, and then use this power for all reference signal transmissions across the entire coverage area. In simpler implementations, the first HeNB 10 may simply receive a single reference signal transmit power from the Network Manager and use this value.

The power of all other signal components (e.g. for data transmission) are transmitted at powers up to this reference signal power value (typically less). In the LTE protocol, the ratio of the power of reference signals to the power of data signals (in dB) are described in parameters pa and pb. The enveloping circle around the first HeNB 10 in FIG. 2 therefore represents the propagation distances of the reference signals in all directions by the second transceiver 17 at this selected reference signal power, and any other signals (e.g. for data) would only transmit up to these points. FIG. 2 also shows a dotted line representing what is known as, in the LTE protocol, the "A2 threshold". This represents a power level and corresponding distance from the base station outside which the UEs are configured to behave in a different manner. For the purposes of this description, these UEs will be referred to as "edge UEs". These edge UEs will be discussed later in this description.

In embodiments of a method of the present disclosure (described in detail below), the first HeNB 10 may use one of more additional transmit powers which are greater than the reference signal power (defined by the Network Manager). These transmit powers, hereinafter known as the "reserved transmit powers", are used to detect PCI conflicts in the network. Before describing embodiments of this method, the UE will described in more detail.

Figure 4:
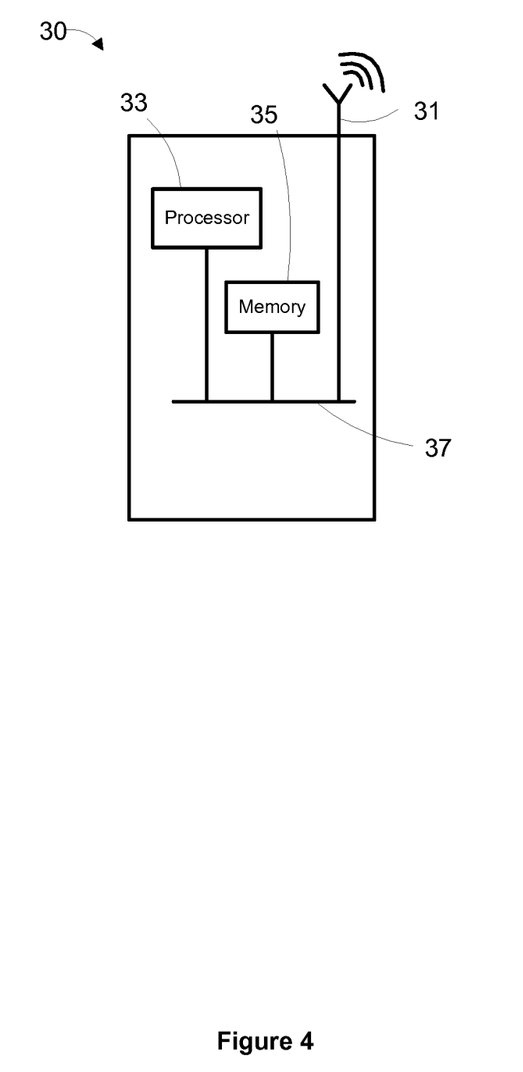
FIG. 4 is a schematic diagram of a User Equipment, UE, of the network of FIG. 2.

A schematic diagram illustrating the UE 30 is shown in FIG. 4. Again, the skilled person will understand that there may be several physical differences between different UEs, and FIG. 4 is just an example. The UE 30 includes a first transceiver 31 (i.e. an antenna), for transmitting and receiving signals with the first HeNB 10 (in this embodiment, via the 4G LTE protocol). The UE 30 also includes a processor 33 and memory 35 connected via bus 37. Typically, the UE 30 includes a display and Human Interface Device (HID), such as a keypad or touch screen, which are not shown in FIG. 4.

As noted above, the UE 30 is within the coverage area of the first HeNB 10 and is connected thereto. Accordingly, the transceiver 31 and processor 33 are configured to measure the UE's radio environment and compile a measurement report. This is typically performed in response to a measurement configuration message from the serving base station to measure channel conditions with the serving base station and/or any neighboring base stations (such as Reference Signal Received Power (RSRP), Reference Signal Received Quality (RSRQ), etc.). In further examples described below, the UE may receive a measurement configuration message from the serving base station to compile certain information regarding neighboring base stations (which, in one embodiment, includes the neighboring base stations' eCGI values), which shall hereinafter be known as a "detailed measurement report". This information is compiled in the UE 30 by the processor 33 and is then sent to the serving base station via the transceiver 31 (and may be temporarily stored in memory 35).

As noted above, edge UEs are those that are positioned outside the A2 threshold. In conventional cellular networks, these edge UEs are configured to produce detailed measurement reports for their serving base station which provide useful information for handover purposes. That is, once an edge UE moves outside the A2 threshold, it may receive a measurement configuration message to scan for any neighboring base station having an RSRP value 3 dB higher than the serving base station and decode the PCIs and eCGIs for these base stations. These values are then reported to the serving base station. The reason for filtering out any base station which doesn't have an RSRP value 3 dB higher than the serving base station is so that only base stations which are good candidates for a handover are reported. The skilled person will understand that this is just one example of a conventional detailed measurement report, and serving base stations may configure UEs to report other parameters (outside those reported in basic measurement reports) depending on the circumstances.

In the present disclosure, the serving base station is configured to send a measurement configuration message to any edge UE to decode and report neighboring base stations' PCI and eCGI values. However, unlike conventional networks, the edge UEs decode the PCI and eCGI of all neighboring base stations. Thus, in a modification of the above method, the edge UEs scan for any neighboring base station having an RSRP value 30 dB lower than the serving base station (or higher), and decodes the PCIs and eCGIs for all these base stations.

Figure 5A:
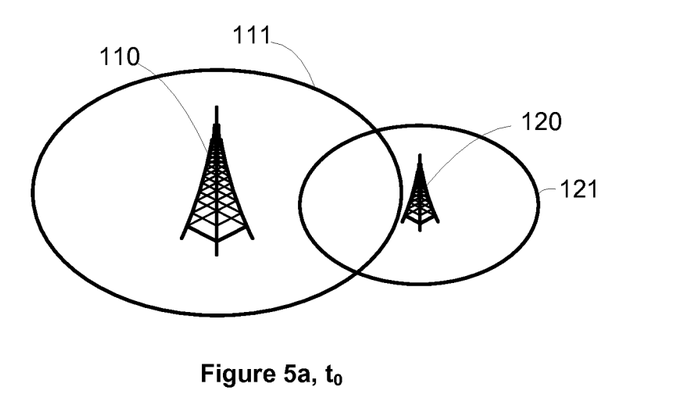
FIGS. 5a to 5c illustrate a first example of a method of the present disclosure.
Figure 5B:
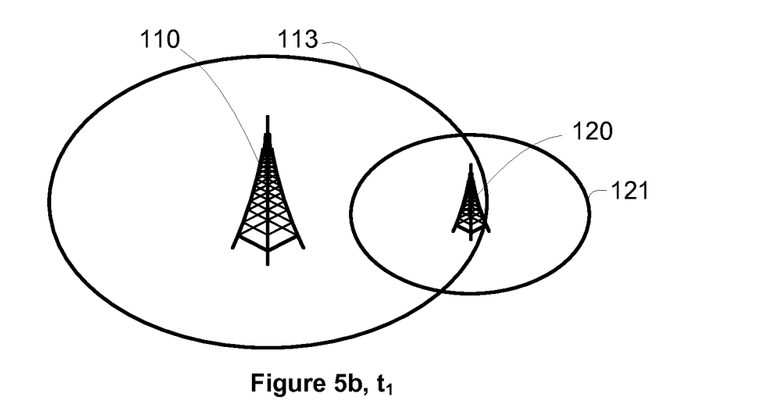
Figure 5C:
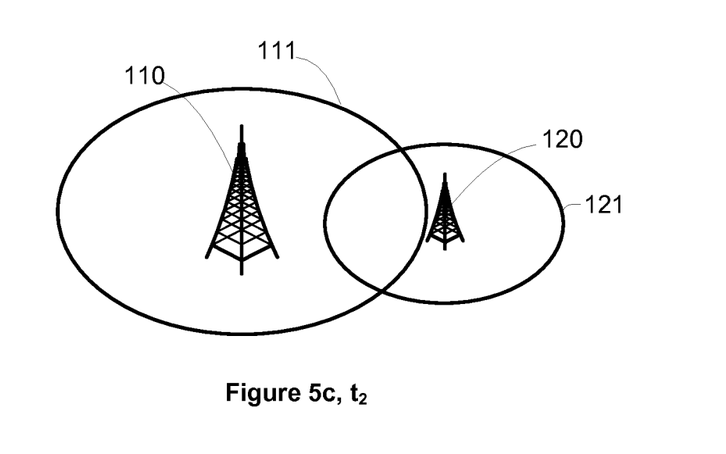

A first embodiment of a method of the present disclosure will now be described with reference to FIGS. 5a, 5b, 5c. In this embodiment, a first and second HeNB 110, 120 are neighboring base stations and have the same PCI value. The first HeNB 110 has a first coverage area 111 and the second HeNB 120 has a second coverage 121, which partially overlap. As noted above, the extremities of these coverage areas are based on the transmit powers used by the first and second HeNBs 110, 120 to transmit reference signals. As shown in FIG. 5a, the coverage area 111 of the first HeNB 110 does not cover the second HeNB 120, and the coverage area 121 of the second HeNB 120 does not cover the first HeNB 110. Thus, at time $t_0$ as shown in FIG. 5a, the first and second HeNBs 110, 120 cannot detect the other base stations' signals and the PCI conflict cannot be detected. However, any UE positioned in the overlapping coverage area may experience significant interference due to this PCI conflict.

In this embodiment, the first HeNB 110 is configured to increase its coverage area at time $t_1$. This may be achieved by increasing the transmit power of transmissions by using one of the reserved transmit powers that is greater than the reference signal transmit power for the first HeNB 110. Accordingly, as shown in FIG. 5b, the new coverage area 113 of the first HeNB 110 is greater than the original coverage area 111 and now covers the second HeNB 120.

The first HeNB 110 also defines a high-transmit power timer, which represents the length of time the first HeNB 110 will temporarily transmit at the reserved transmit power before returning to the reference signal transmit power (which would return the coverage area of the first HeNB 110 to its usual size).

Thus, before the high-transmit power timer expires, the first HeNB 110 transmits signals about a larger coverage area which covers the second HeNB 120. These signals, including the Primary Synchronization Signal (PSS), the Secondary Synchronization Signal (SSS) and other reference signals, may be decoded by the second HeNB 120. Next in the method, the second HeNB 120 performs a detailed REM scan of its radio environment. The detailed REM scan is one in which the second HeNB 120 decodes the PCI and E-UTRAN Cell Global Identifier (eCGI) of any signals received by neighboring base stations. Accordingly, the second HeNB 120 detects the PCI and eCGI of the first HeNB 110, and determines that the neighboring base station has a conflicting PCI. The second HeNB 200 therefore initiates a PCI conflict resolution process. This may involve the first and/or second HeNB 110, 120 changing its PCI such that they no longer conflict with each other and potentially with any other neighbors. The second HeNB 120 may also instruct the first HeNB 110 to perform the PCI conflict resolution process by setting up an X2 connection and using appropriate signaling.

In this embodiment, the second HeNB 120 is configured to perform periodic detailed REM scans such that it may detect a neighbor transmitting using one of the reserved transmit powers. However, it is also possible that the second HeNB 120 may receive more measurement reports from UEs at time $t_1$ than at time $t_0$ indicating significant interference. Accordingly, the second HeNB 120 may react to this increased frequency of such measurement reports by initiating a detailed REM scan, which would then detect the PCI conflict and initiate a PCI conflict resolution process.

At time $t_2$, the high-transmit power timer expires and the first HeNB 110 reduces its coverage area by no longer using the reserved transmit powers and instead using the reference signal transmit power. Accordingly, as shown in FIG. 5c, the coverage area of the first HeNB 110 now no longer covers the second HenB 120. Furthermore, as the PCI conflict between the two HeNBs 110, 120 has been removed, UEs in the overlapping coverage area will not experience any interference that was previously experienced at time $t_0$.

Figure 6A:
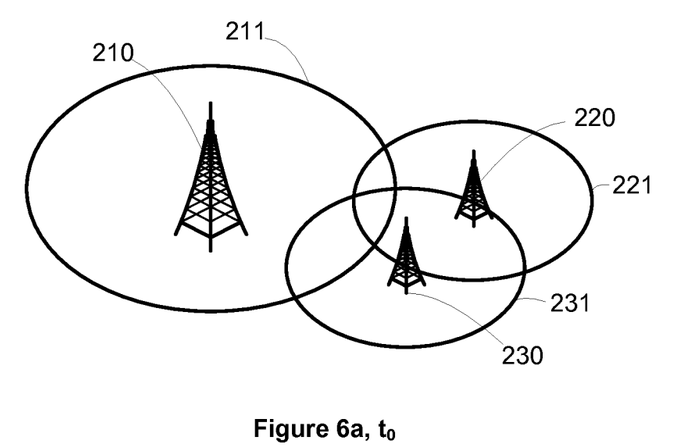
FIGS. 6a to 6c illustrate a second example of a method of the present disclosure.
Figure 6B:
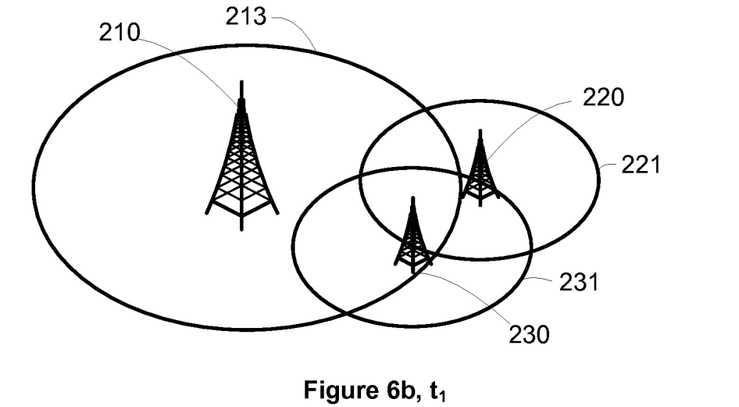
Figure 6C:
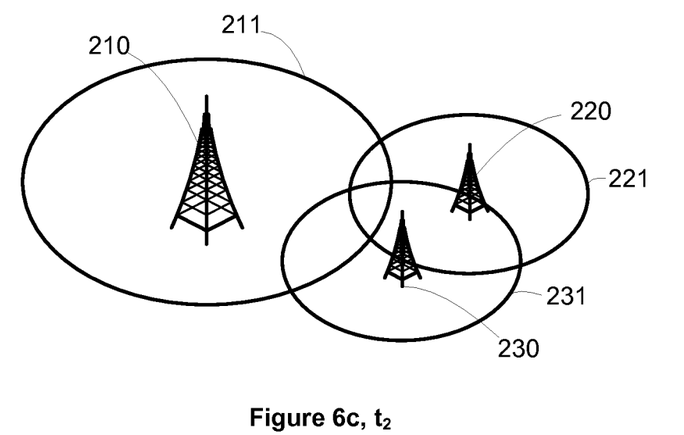

A second embodiment of a method of the present disclosure will now be described with reference to FIGS. 6a to 6c. In this embodiment, the network includes a first, second and third HeNB 210, 220, 230. The second and third HeNBs 220, 230 are neighbors and are aware of each other. The first and second HeNBs 210, 220 have the same PCI value, which is different to that of the third HeNB 230.

At time $t_0$, the first HeNB 210 has a coverage area that overlaps with those of the second and third HeNBs 220, 230. However, as this does not cover either the second or third HeNB 220, 230, no base station is able to detect that the first and second HeNB 210, 220 have the same PCI. Thus, any UE in the overlapping coverage area of the first and second HeNB 210, 220 may experience significant interference.

At time $t_1$, the first HeNB 210 increases its coverage area by increasing the transmit power by using one of the reserved transmit powers that is greater than the reference signal transmit power. The first HeNB 210 also starts a high-transmit power timer defining the amount of time the first HeNB 210 temporarily transmits at this reserved transmit power. As shown in FIG. 6b, this new coverage area 213 covers the third HeNB 230.

Similar to the first embodiment above, the first HeNB 210 transmits signals about its new coverage area, which includes the PSS and SSS signals and Master and System Information Blocks (MIB/SIB), which are received and decoded by the third HeNB 230 during a detailed REM scan. The third HeNB 230 therefore detects that it has two neighbors using the same PCI, but have different eCGIs. Next in the method, the third HeNB 230 sends an X2 message to the second HeNB 220 informing it of the PCI conflict so that the conflict can be resolved. The first HeNB 210 may also be informed of the PCI conflict, either directly from the third HeNB 230 or via the second HeNB 220 (e.g. by X2 messaging). The PCI conflict may then be resolved by either the first or second HeNB 210, 220 changing its PCI such that they do not conflict with each other or any neighbors.

At time $t_2$, the high-transmit power timer expires and the first HeNB 210 reduces its coverage area by no longer using the reserved transmit powers and instead using the reference signal transmit power. Accordingly, as shown in FIG. 6c, the coverage area of the first HeNB 210 now no longer covers the third HeNB 220. Furthermore, as the PCI conflict between the first and second HeNB 210, 220 has been removed, UEs in the overlapping coverage area will not experience any interference that was previously experienced at time $t_0$.

Figure 7A:
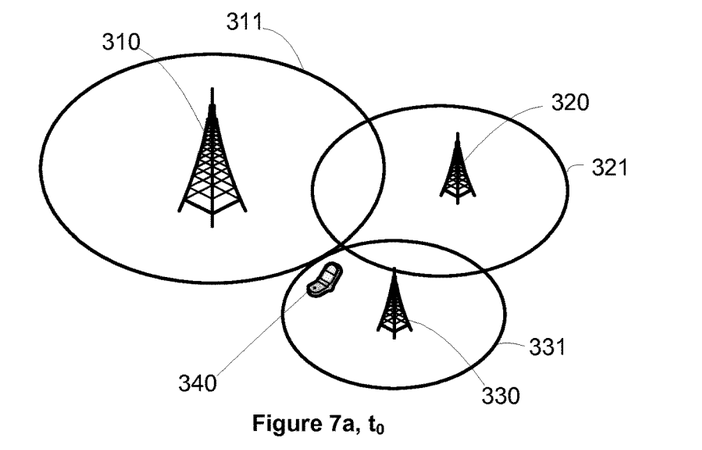
FIGS. 7a to 7c illustrate a third example of a method of the present disclosure.

A third embodiment of a method of the present disclosure will now be described with reference to FIGS. 7a to 7c. The network includes a first, second and third HeNB 310, 320, 330. The first and second HeNBs 310, 320 have overlapping coverage areas, and the second and third HeNBs 320, 330 have overlapping coverage areas. However, at time $t_0$, as shown in FIG. 7a, the first and third HeNBs 310, 330 do not have an overlapping coverage area. Furthermore, the first and second HeNBs 310, 320 have the same PCI (and thus UEs in the overlapping coverage area may experience significant interference), which is different to that used by the third HeNB 330. The second and third HeNBs 320, 330 are neighbors and include a Neighbor Relations Table (NRT) including the PCI and eCGI values of the neighboring base station.

FIG. 7a also illustrates a first UE 340. In this embodiment, at time $t_0$, the first UE 340 is positioned within the third HeNB's coverage area 331 only. As the first UE 340 is an edge UE (i.e. it is positioned towards the edge of its serving base station's coverage area), it is configured to send detailed measurement reports to the third HeNB 330.

Figure 7B:
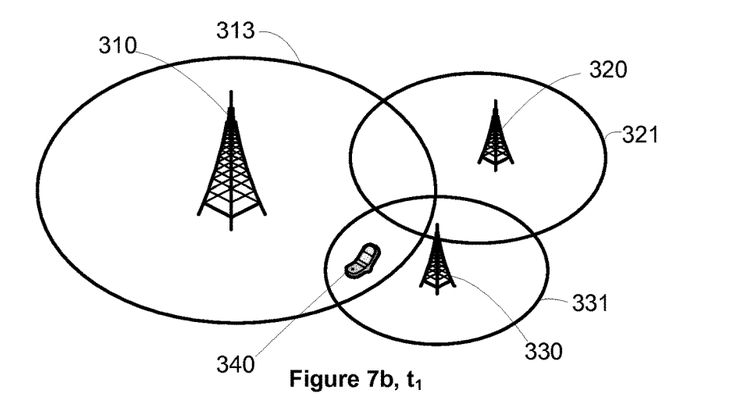

In this embodiment, as shown in FIG. 7b at time $t_1$, the first HeNB 310 increases its coverage area by using one of the reserved transmit powers which are greater than the reference signal transmit power. The first HeNB 310 also starts a high-transmit power timer defining the amount of time the first HeNB 310 uses the reserved transmit power. The new coverage area 313 now overlaps with both those of the second and third HeNBs 320, 330.

In this embodiment, the first UE 340 is now positioned within the overlapping coverage area of the first and third HeNBs 310, 330. As the first UE 340 is an edge UE, it prepares a detailed measurement report identifying the first HeNB 310 (including its PCI and eCGI), and sends the report to the third HeNB 330. The third HeNB 330 includes the second HeNB's details in its NRT. Thus, by comparing the PCIs and eCGIs of the first and second HeNB 310, 320, the third HeNB 330 is able to determine that there's a PCI conflict, and a PCI conflict resolution process is initiated.

Figure 7C:
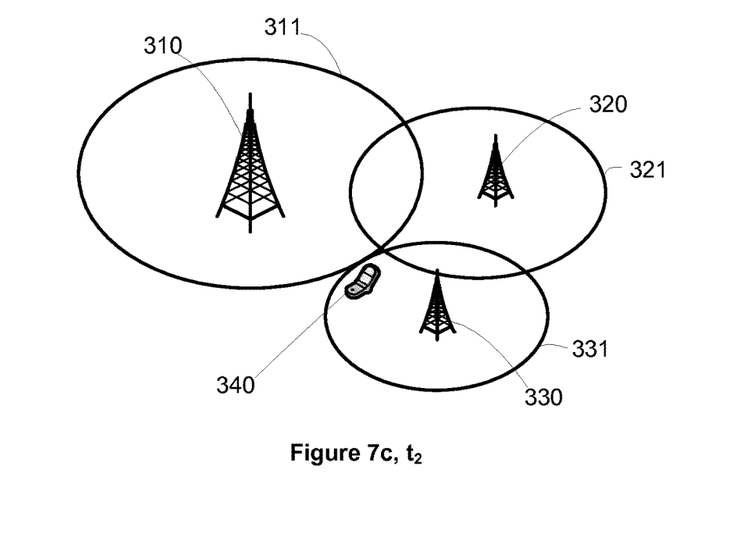

At time $t_2$ (as shown in FIG. 7c), the high transmit power timer expires and the first HeNB 310 reduces its coverage area by returning to the reference signal transmit power.

The skilled person will understand that the concept outlined in the third embodiment is also applicable in a two base station setup in which both base stations have the same PCI and the UE is connected to one base station as an edge UE. In this arrangement, the UE will again capture the other base station's PCI and eCGI during a periodic detailed measurement report when the other base station performs a temporary power which results in the UE being in an overlapping coverage area of the two base stations. The serving base station may then initiate a PCI resolution process.

Furthermore, in another version of the third embodiment, the UE 340 may disconnect from the third HeNB 330 at time $t_1$ and connect to the first HeNB 310. The first HeNB 310 will then learn of the third HeNB's PCI and eCGI values, which allows the first HeNB 310 to query the NRT of the third HeNB 330 and discover the PCI and eCGI values of the second HeNB 320. The first HeNB 310 will then discover that it has the same PCI value as that of a neighbor's neighbor, and therefore a potential PCI conflict. It may then initiate a PCI resolution process.

In the above embodiment, the UE is an edge UE and is therefore configured to send detailed measurement reports to the third HeNB 330 (including the PCI and eCGI values of all neighboring base stations). However, the skilled person will understand that this is not the only situation in which the UE may send detailed measurement reports. The UE may initially be configured to send basic measurement reports to the serving base station. However, at time $t_1$, the UE 340 suddenly reports the presence of a new base station (the first HeNB 310) having the PCI of the second HeNB 320. As the basic measurement reports of the UE 340 up to that point indicate that the UE 340 is stationary (e.g. the RSRP values are relatively constant), then the sudden appearance of the new base station is unusual and the third HeNB 330 is therefore configured to send a measurement configuration message to the UE 340 such that it prepares a detailed measurement report. The third HeNB 330 therefore discovers the PCI and eCGI values of the first HeNB 310 and detects the PCI conflict.

Figure 8A:
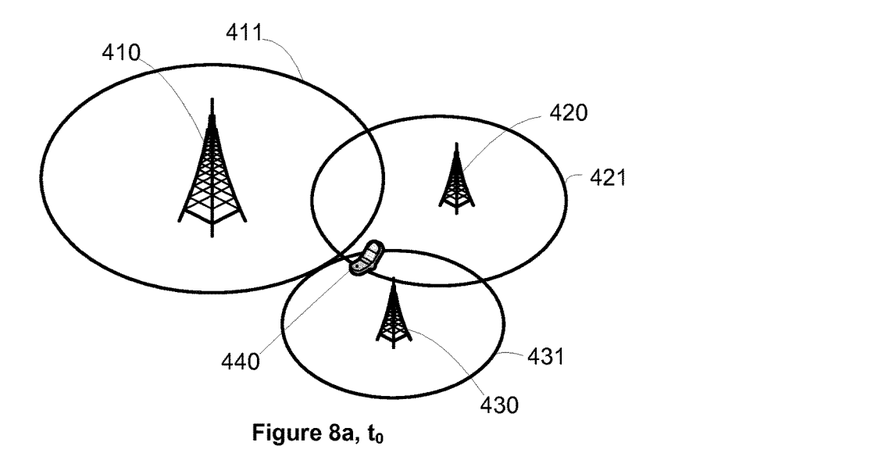
FIGS. 8 to 8c illustrate a fourth example of a method of the present disclosure.

A fourth embodiment of a method of the present disclosure will now be described with reference to FIGS. 8a to 8c. This embodiment again includes a first, second and third HeNB 410, 420, 430. The first and second HeNBs 410, 420 have overlapping coverage areas, and the second and third HeNBs 420, 430 have overlapping coverage areas. However, at time $t_0$, as shown in FIG. 8a, the first and third HeNBs 410 do not have an overlapping coverage area. Furthermore, the first and second HeNBs 410, 420 have the same PCI (and thus UEs in the overlapping coverage area may experience significant interference), which is different to that used by the third HeNB 430. The second and third HeNBs 420, 430 are neighbors and are aware of each other (e.g. due to a measurement report from one or more UEs identifying each base station). The second and third HeNBs 420, 430 therefore include a Neighbor Relations Table (NRT) including the PCI and eCGI values of the neighboring base station.

FIG. 8a also illustrates a first UE 440. In this embodiment, the first UE 440 is within the overlapping coverage area of the second and third HeNBs 420, 430, and is connected to the third HeNB 430.

Figure 8B:
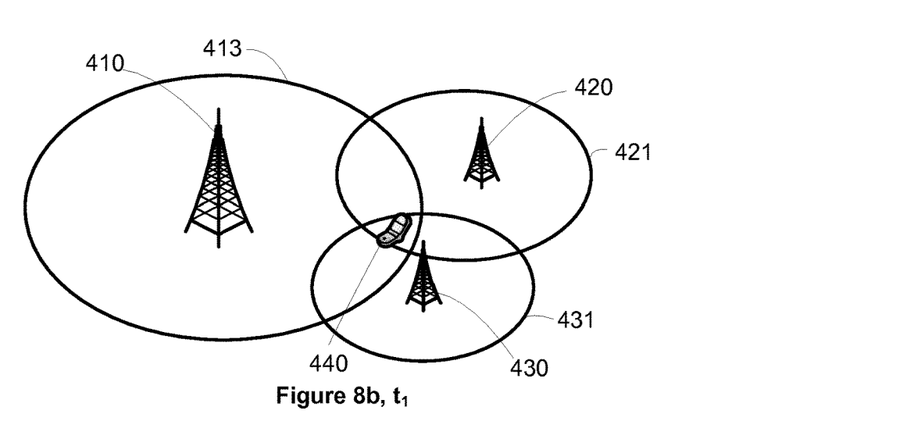

As shown in FIG. 8b, at time $t_1$, the first HeNB 410 increases its coverage area by using one of the reserved transmit powers which are greater than the reference signal transmit power. The first HeNB 410 also starts a high-transmit power timer defining the amount of time the first HeNB 410 uses the reserved transmit power. The new coverage area 413 now overlaps with both those of the second and third HeNBs 420, 430.

In this embodiment, the overlapping coverage area now covers the first UE 440 (which, as noted above, is connected to the third HeNB 430). At this stage, it is not yet possible for the third HeNB 430 to identify the PCI conflict between the first and second HeNBs 410, 420. There are several options for the system to discover the PCI conflict.

In a first example, the first UE 440 will experience differing levels of received power for reference signals associated with the PCI of the first and second HeNB 420 before the high-transmit power timer expires. This is because the first UE 440 would be experiencing a particular Reference Signal Received Power (RSRP) from the second HeNB 420 only (which would not change substantially over time) before the first HeNB 410 increased its coverage area. However, when the first HeNB 410 increases its coverage area, the first UE receives reference signals from both HeNBs at different powers. The first UE 440 does not detect that the reference signals are from different HeNBs as it only decodes the PCI and RSRP for reporting purposes. The first UE 440 therefore sends a (basic) measurement report to the third HeNB 430 indicating that the RSRP of the second HeNB 420 (which, as noted above, is actually a mixture of the first and second HeNB 410, 420) has substantially changed. The third HeNB 430 then responds to such a measurement report by sending the first UE 440 a measurement configuration message instructing it to prepare a detailed measurement report. The first UE 440 receives this instruction message for a detailed measurement report, and decodes both the PCI and eCGI values of all nearby base stations. The first UE 440 thus decodes the PCI and eCGI values of the first and second HeNBs 410, 420, and reports these to the third HeNB 430. The third HeNB 430 receives this message and determines that there is a PCI conflict between the first and second HeNB 410, 420, and a PCI conflict resolution process is initiated.

Alternatively, in a second example, the first UE 440 disconnects from the third HeNB 430 and connects to the first HeNB 410 (e.g. due to a Radio Link Failure (RLF) in connected mode or due to cell reselection in idle mode). The first HeNB 410 therefore learns of the third HeNB's PCI and eCGI values, such that it may query the NRT of the third HeNB 430 via X2 message to discover the PCI and eCGI values of the second HeNB 420. The first HeNB 410 may then determine that it has a PCI conflict with the second HeNB 420.

Figure 8C:
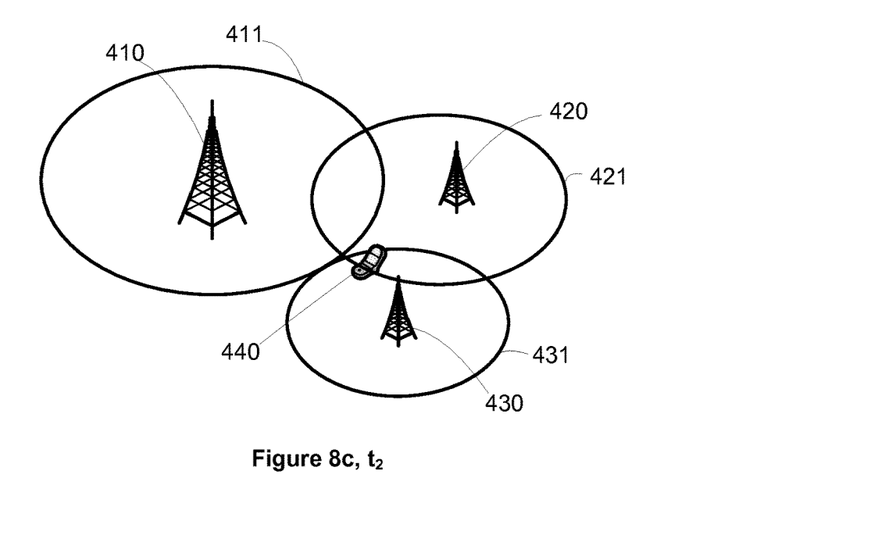

At time $t_2$ (as shown in FIG. 8c), the high transmit power timer expires and the first HeNB 410 reduces its coverage area by returning to the reference signal transmit power.

Figure 9:
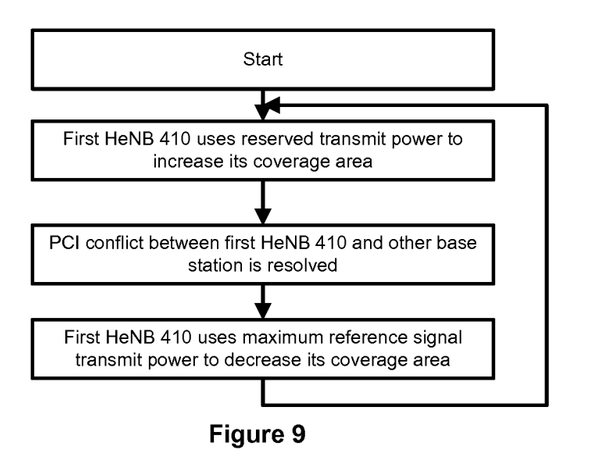
FIG. 9 illustrates a first embodiment of a method of the present disclosure.

A first embodiment of a method of operating a base station will now be described, with reference to FIG. 9. The base station (hereinafter, the first HeNB 410) receives a configuration message from the Network Manager defining one or more power levels it may use for its reference signals. As described in more detail above, the first HeNB 410 defines its maximum reference signal transmit power based on this message. The first HeNB 410 also defines, for PCI conflict detection purposes, a reserved transmit power. In normal operation, the first HeNB 410 uses the maximum reference signal transmit power for its reference signals, which defines its coverage area. The method starts in response to a timer expiring or due to a trigger. In S1.1, the first HeNB 410 increases its coverage area by increasing its transmit power from the maximum reference signal transmit power to a reserved transmit power. This increases its coverage area such that it may cover a neighboring base station or a new UE. In S1.3, the PCI conflict between the first HeNB 410 and the neighboring base station is resolved (this may either be a result of other base stations taking the necessary actions to resolve this, or may be in part due to the first HeNB 410 receiving messages advising of the conflict and the first HeNB 410 initiating a PCI conflict resolution process). In S1.5, the first HeNB 410 reduces its coverage area by decreasing its transmit power from the reserved transmit power to the maximum reference signal transmit power.

Figure 10:
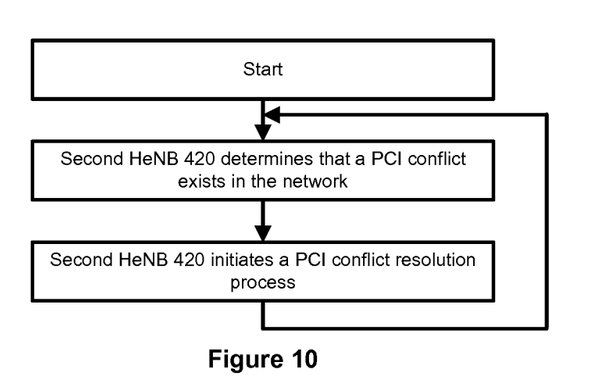
FIG. 10 illustrates a second embodiment of a method of the present disclosure.

A second embodiment of a method of operating a base station will now be described, with reference to FIG. 10. The method starts at S2.1 with the second base station (hereinafter, the second HeNB 420) determining that a PCI conflict exists in the network. This may be in response to performing a periodic detailed REM scan or due to receiving a detailed measurement report from a UE. In S2.3, the second HeNB 420 initiates a PCI conflict resolution process. This may be by changing its own PCI value, or by setting up an X2 connection with another base station and causing that base station to change its PCI value.

In the above embodiments, the base stations temporarily use a "reserved transmit power" or "range of reserved transmit powers" in order to cause a PCI conflict detection event in the network. In other words, one base station in the network has a particular transmit power which it uses for a relatively long period of time (which would be configured for normal operation using its particular configuration algorithms), but then uses a greater transmit power for a relatively short period of time. This brief increase in transmit power could be a time-driven event (e.g. once a day) or event triggered. However, the base station is not in communication with the other base station (having a conflicting PCI) before the increase in transmit power. That is, the process of increasing the transmit power to cause to the PCI conflict detection event is autonomous (i.e. not initiated due to the base station learning of the conflict with another base station).

The skilled person would understand that any combination of features is possible within the scope of the invention, as claimed.

The invention claimed is:

1. A method of operating a first base station in a cellular telecommunications network, the cellular telecommunications network further including a second base station, the method comprising:
   by the first base station:
   transmitting at a first transmit power about a first coverage area for a first period of time;
   transmitting at a second transmit power about a second coverage area for a second period of time, the second coverage area being larger than the first coverage area and the second period of time being shorter than the first period of time, in order to autonomously create a detection scenario for a Physical Cell Identifier (PCI) conflict between the first and second base station; and then
   returning to the first transmit power.

2. The method as claimed in claim 1, wherein the first base station initiates the increase from the first transit power to the second transmit power periodically.

3. The method as claimed in claim 1, wherein the cellular telecommunications network further includes a Network Management node, the method further comprising, initially:
  the first base station receiving a configuration message from the Network Management node, wherein the first transmit power is based on the configuration message.

4. The method as claimed in claim 1, wherein the first base station is configured to send a measurement configuration message to a User Equipment (UE) to cause the UE to report the PCI and a further base station identifier of the second base station.

5. The method as claimed in claim 4, wherein a measured Reference Signal Received Power (RSRP) value of the second base station is less than that of the first base station.

6. A non-transitory computer-readable storage medium storing a computer program containing computer-executable code which, when executed on a computer, causes the computer to perform the method of claim 1.

7. A method of operating a cellular telecommunications network, the network including a first base station configured to transmit at a first transmit power about a first coverage area for a first period of time, transmit at a second transmit power about a second coverage area for a second period of time, the second coverage area being larger than the first coverage area and the second period of time being shorter than the first period of time, in order to autonomously create a detection scenario for a Physical Cell Identifier (PCI) conflict between the first base station and the second base station, and then return to the first transmit power, the network further comprising a second base station, the method comprising:
  by the second base station:
    discovering the first base station as a result of the first base station transmitting at the second transmit power and coverage area,
    identifying a PCI conflict in the cellular telecommunications network, and
    initiating a PCI conflict resolution process.

8. The method as claimed in claim 7, wherein the second base station discovering the first base station includes:
  the second base station periodically scanning its radio environment; and
  the second base station discovering the first base station's PCI and a further base station identifier.

9. The method as claimed in claim 7, wherein the second base station discovers the first base station in response to the second base station receiving a report message from a User Equipment (UE).

10. The method as claimed in claim 9, wherein, in response to the report message from the UE, the second base station sends a configuration message to the UE instructing the UE to decode the first base station's PCI and a further base station identifier.

11. The method as claimed in claim 7, wherein the PCI conflict is between the first base station and the second base station.

12. The method as claimed in claim 7, wherein the PCI conflict is between the first base station and a third base station, and the method further comprises:
  the second base station instructing the first base station or the third base station to complete the PCI conflict resolution process.

13. A non-transitory computer-readable storage medium storing a computer program containing computer-executable code which, when executed on a computer, causes the computer to perform the method of claim 7.

14. A first base station in a cellular telecommunications network, the cellular telecommunications network further including a second base station, comprising:
  a transceiver and a processor configured to:
    transmit at a first transmit power about a first coverage area for a first period of time,
    transmit at a second transmit power about a second coverage area for a second period of time, the second coverage area being larger than the first coverage area and the second period of time being shorter than the first period of time, in order to autonomously create a detection scenario for a Physical Cell Identifier (PCI) conflict with the second base station, and then
    return to the first transmit power.

15. A second base station in a cellular telecommunications network, the cellular telecommunications network including a first base station configured to transmit at a first transmit power about a first coverage area for a first period of time, transmit at a second transmit power about a second coverage area for a second period of time, the second coverage area being larger than the first coverage area and the second period of time being shorter than the first period of time, in order to autonomously create a detection scenario for a Physical Cell Identifier (PCI) conflict between the first base station and the second base station, and then return to the first transmit power, the second base station comprising:
  a transceiver and a processor configured to:
    discover the first base station as a result of the first base station transmitting at the second transmit power and coverage area,
    identify a PCI conflict in the cellular telecommunications network, and
    initiate a PCI conflict resolution process.

* * * * *